No. 853,574. PATENTED MAY 14, 1907.
N. H. BLOOM.
RIDING ATTACHMENT FOR AGRICULTURAL IMPLEMENTS.
APPLICATION FILED JUNE 29, 1905.

Witnesses
Howard D. Orr.
B. G. Foster.

Nicklas H. Bloom, Inventor,
By E. G. Siggers
Attorney

UNITED STATES PATENT OFFICE.

NICKLAS H. BLOOM, OF NASHUA, IOWA.

RIDING ATTACHMENT FOR AGRICULTURAL IMPLEMENTS.

No. 853,574.

Specification of Letters Patent.

Patented May 14, 1907.

Application filed June 29, 1905. Serial No. 267,572.

*To all whom it may concern:*

Be it known that I, NICKLAS H. BLOOM, a citizen of the United States, residing at Nashua, in the county of Chickasaw and State of Iowa, have invented a new and useful Riding Attachment for Agricultural Implements, of which the following is a specification.

This invention relates to improvements adapted to be attached to harrows or other agricultural implements and constituting a vehicular support for the driver or operator of the implement.

In one aspect, the invention is in the nature of an improvement on a prior patent, granted to me on January 10, 1905 and numbered 779,519.

The principal object is to provide a simple structure of a novel nature, which is strong, rigid and durable, that may be readily applied to an agricultural implement, and will properly operate in conjunction with the same, not only during its movement in a straight line over a field, but also in making turns and curves.

Figure 1:
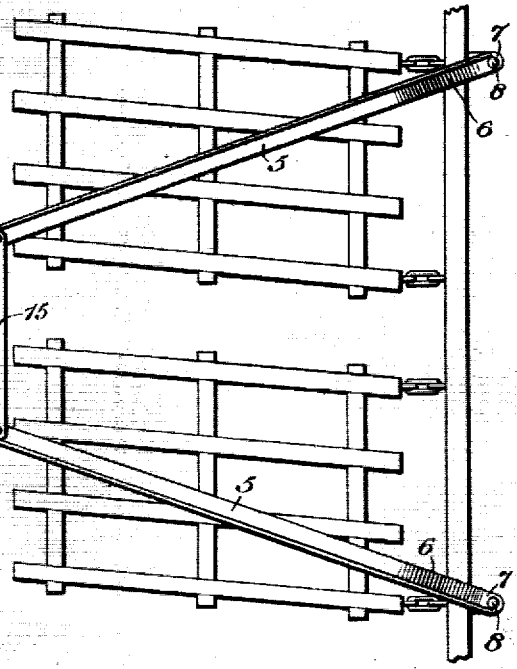
Figure 2:
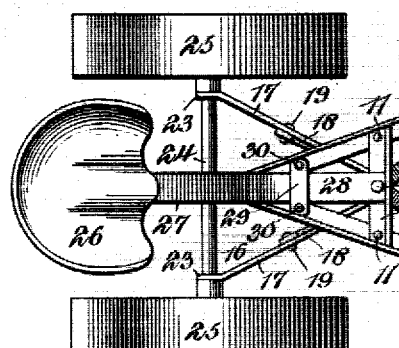
Figure 2:
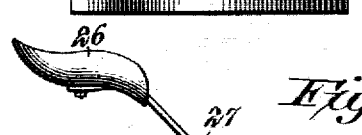
Figure 3:
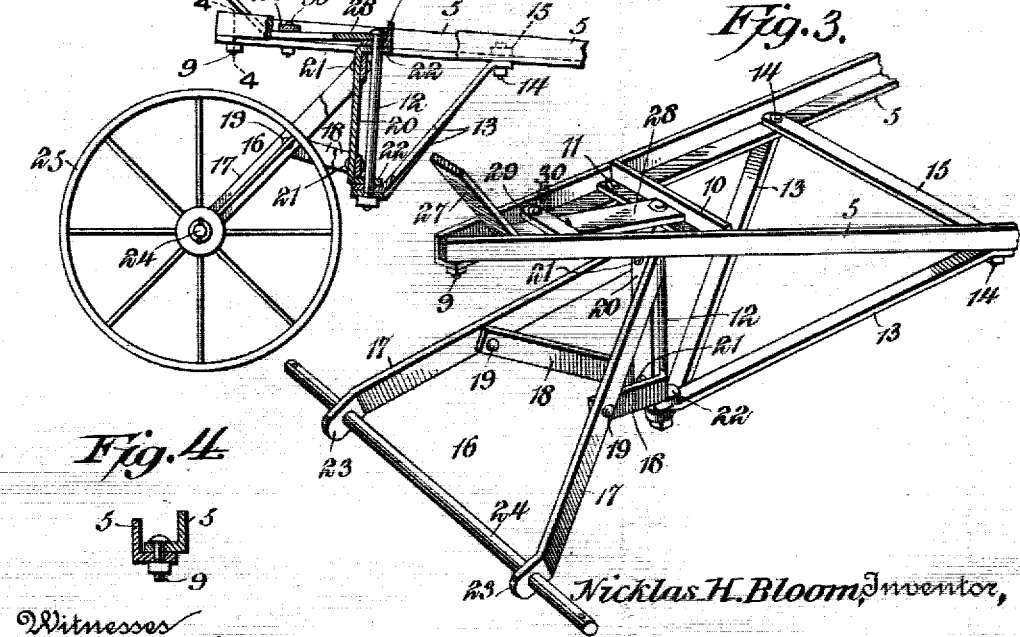
Figure 4:

The preferred embodiment of the invention is illustrated in the accompanying drawings, wherein:

Figure 1 is a top plan view of the attachment connected to a harrow. Fig. 2 is a vertical sectional view through the rear portion of the attachment. Fig. 3 is a detail perspective view of the rear portion of the structure with the wheels removed. Fig. 4 is a detail sectional view on the line 4—4 of Fig. 2.

Similar reference numerals designate corresponding parts in all the figures of the drawings.

In the embodiment illustrated, convergently disposed reach bars 5 are employed, that are preferably formed of angle iron, having downturned front portions 6, the terminals 7 of which constitute ears for receiving bolts or other fasteners 8, whereby the device can be attached to a harrow or other implement. The rear ends of the reach bars are connected, their horizontal flanges being overlapped and fastened by a bolt 9, as shown in Fig. 4. A cross bar 10 of angle iron bridges the space between the reach bars in advance of their connected ends, being fastened, as shown at 11, to the horizontal flanges of said bars. A substantially upright pivot bolt 12, located in the plane between the reach bars, has its upper end passing through the horizontal flange of the cross bar 10, while its lower end is maintained in position by divergently disposed braces 13, the lower ends of which are fitted on the lower end of the pivot bolt, their upper ends being fastened, as shown at 14, to the horizontal flanges 5 of the reach bars in advance of the cross bar 10. A brace 15 connects the reach bars and has its ends fastened thereto by the bolts 14.

Journaled upon the pivot bolt 12 is a tapering wheel frame 16. This frame is composed of side arms 17, formed of a doubled strap, other side arms formed of another doubled strap having their rear ends connected to the side arms 17, between the ends thereof, as shown at 19. An upright strap 20, located within the straps forming the side arms 17 and 18, has its upper and lower portions fastened thereto, as illustrated at 21, the terminals of this upright strap being offset and forming ears 22, which are journaled, respectively, upon the upper and lower portions of the pivot bolt 12. The rear ends of the side arms 17 are similarly offset, as shown at 23, and passing through the same is an axle 24, having its ends projecting outside the side arms to receive ground wheels 25, journaled on said projecting ends.

A seat 26 is provided with the usual spring standard 27, and the lower end of the standard is offset, as shown at 28, resting upon the horizontal flanges of the reach bars 5 contiguous to their juncture, the front terminal of the standard bearing upon the horizontal flange of the cross bar 10 and being secured thereto by the upper headed end of the pivot bolt 12, which passes through said front end and through the cross bar. A clip plate 29 extends across the portion of the standard that bears upon the horizontal flanges of the reach bars, said clip plate being held in position by bolts or other fasteners 30, passing through the horizontal flanges of said reach bars. It will be observed that the seat is thus mounted on the reach bars and in rear of the connection of the wheel frame therewith. This wheel frame not only trails behind its pivotal connection, but turns freely with respect thereto. Therefore, the attachment when connected to an agricultural implement will properly operate in conjunction therewith, not only in passing over a field, but in making the turns.

It will be observed that the structure is simple and can be easily and cheaply manufactured. At the same time, it is strong and durable so as to withstand rough usage and hard service upon uneven ground.

From the foregoing it is thought that the construction, operation, and many advantages of the herein described invention will be apparent to those skilled in the art, without further description, and it will be understood that various changes in the size, shape, proportion, and various details of construction may be resorted to without departing from the spirit or sacrificing any of the advantages of the invention.

Having thus described my invention what I claim as new and desire to secure by Letters Patent, is:

1. In a riding attachment of the class described, the combination with convergently disposed reach bars, of a cross bar connecting the rear portions of the reach bars, an upright pivot bolt having its upper end connected to the cross bar, between the reach bars, braces connected to the lower end of the pivot bolt and to the reach bars, and a wheel frame mounted on the pivot bolt and having a free swinging movement with said bolt as an axis.

2. In a riding attachment of the class described, the combination with reach bars, of a pivot bolt disposed centrally between the reach bars and having its upper end connected thereto, divergent braces connected to the lower end of the pivot bolt and to the reach bars, and a freely swinging trailing wheel frame connected at its front end to the pivot bolt.

3. In a riding attachment of the class described, the combination with convergently disposed reach bars, of a cross bar connecting the rear portions of the reach bars, an upright pivot bolt having its upper end connected to the cross bar between the reach bars, divergent braces connected to the lower end of the pivot bolt and to the reach bars, a frame mounted on the pivot bolt and having a free swinging movement with said bolt as an axis, an axle carried by the frame, and spaced wheels journaled on the axle.

4. In a riding attachment of the class described, the combination with reach bars, of an upright pivot bolt connected thereto, a tapering frame having its tapered front end mounted on the pivot bolt, an axle carried by the wider rear end of the frame, and spaced wheels carried by the axle.

5. In a riding attachment of the class described, the combination with reach bars, of an upright pivot bolt connected thereto, a tapering frame having its tapered front end mounted on the pivot bolt, said frame including side arms, the rear ends of which are spaced apart, an axle connected to said rear ends and projecting outside the same, and wheels journaled on the projecting ends of the axle and being located outside the frame.

6. In a riding attachment of the class described, the combination with spaced reach bars, of a substantially upright pivot bolt located in an upright plane which lies between said bars, and a wheel frame including arms, an upright connected to the arms and having offset ears that are journaled on the pivot bolt, an axle carried by the frame, and spaced wheels journaled on the axle.

7. In a riding attachment of the class described, the combination with spaced reach bars, of a substantially upright pivot bolt disposed between the reach bars, and a wheel frame comprising angularly disposed arms formed of doubled straps, an upright strap located within and secured to the doubled straps, said upright strap having offset terminal ears journaled on the pivot bolt, an axle carried by the rear terminals of one of the straps and having its ends projecting beyond the outer sides thereof, and wheels journaled on said projecting ends.

8. In a riding attachment of the class described, the combination with convergently disposed reach bars having their rear ends connected, of a cross bar connecting the reach bars in advance of their connected ends, an upright pivot bolt having its upper end connected to the cross bar between the reach bars, divergently disposed braces connected at their lower ends to the pivot bolt and having their upper ends connected to the reach bars, a brace between the reach bars at the juncture of the pivot bolt braces therewith, a tapering wheel frame having its front end journaled on the pivot bolt, an axle carried by the wider rear end of the frame, spaced wheels journaled on the axle, and a seat supported on the reach bars.

9. In a riding attachment of the class described, the combination with reach bars having their rear ends connected, of a freely swinging trailing wheel frame pivoted to and between the reach bars, an axle carried by the rear portion of the frame and projecting on opposite sides of the reach bars, wheels journaled on said projecting portions, and a seat having a standard mounted on and secured to the reach bars.

10. In a riding attachment of the class described, the combination with reach bars having their rear ends connected, of a cross bar connecting the reach bars in advance of their connected rear ends, a wheel frame supporting the rear ends of the reach bars, a seat having a standard that bears upon the rear ends of the reach bars and against the cross bar, and means for fastening the standard to said connected ends and to the cross bar.

11. In a riding attachment of the class described, the combination with reach bars, of a freely swinging trailing wheel frame pivotally connected to the reach bars in advance of their rear ends, an axle carried by the frame and projecting beyond opposite sides of the reach bars, wheels mounted on the projecting portions of the axle, and a seat supported on the reach bars in rear of said pivotal connection.

12. In a riding attachment of the class described, the combination with convergently disposed reach bars having their rear ends connected, of a cross bar connecting the reach bars in advance of their connected ends, a freely swinging wheel frame pivoted to the cross bar between the reach bars, a seat having a standard mounted on the connected rear ends of the bars in rear of said cross bar and a clip connected to the reach bars and engaging over the standard.

13. In a riding attachment of the class described, the combination with convergently disposed reach bars, of a wheel frame tapering in an opposite direction to the reach bars, and a pivot bolt connecting the convergently disposed portions of the reach bars and the tapered end of the frame.

In testimony, that I claim the foregoing as my own, I have hereto affixed my signature in the presence of two witnesses.

NICKLAS H. BLOOM.

Witnesses:
    A. E. DYE,
    W. F. GETSCH.